United States Patent
Matthys

(10) Patent No.: US 9,050,884 B2
(45) Date of Patent: Jun. 9, 2015

(54) DUAL CAPACITY FLUID TANK ASSEMBLY

(71) Applicant: Progress Rail Services Corporation, Albertville, AL (US)

(72) Inventor: Hector Marcel Matthys, Cottonwood, MN (US)

(73) Assignee: Progress Rail Services Corporation, Albertville, AL (US)

( * ) Notice: Subject to any disclaimer, the term of this patent is extended or adjusted under 35 U.S.C. 154(b) by 218 days.

(21) Appl. No.: 13/872,645

(22) Filed: Apr. 29, 2013

(65) Prior Publication Data

US 2014/0318632 A1  Oct. 30, 2014

(51) Int. Cl.
*F16K 31/18* (2006.01)
*B60K 15/03* (2006.01)
*B60K 15/04* (2006.01)
*F16K 21/18* (2006.01)
*B60K 15/035* (2006.01)

(52) U.S. Cl.
CPC ............... *B60K 15/03* (2013.01); *F16K 21/18* (2013.01); *B60K 2015/03289* (2013.01); *B60K 2015/03523* (2013.01); *B60K 2015/03368* (2013.01); *B60K 2015/03335* (2013.01); *B60K 15/04* (2013.01); *B60Y 2200/22* (2013.01); *B60Y 2200/30* (2013.01); *B60Y 2200/31* (2013.01); *B60Y 2200/41* (2013.01); *B60K 2015/0496* (2013.01)

(58) Field of Classification Search
CPC ......... B60K 15/03; B60K 15/04; F16K 21/18
USPC .............. 137/87.02, 120, 122, 269, 391, 398, 137/426, 587
See application file for complete search history.

(56) References Cited

U.S. PATENT DOCUMENTS

| | | | | |
|---|---|---|---|---|
| 2,604,112 A | * | 7/1952 | Thorsheim | 137/126 |
| 5,522,415 A | | 6/1996 | Hopenfeld | |
| 5,669,361 A | * | 9/1997 | Weissinger et al. | 123/520 |
| 6,488,015 B2 | * | 12/2002 | Isobe | 123/520 |
| 6,547,091 B2 | * | 4/2003 | Hagenbuch | 220/563 |
| 7,089,954 B2 | | 8/2006 | Crawford | |
| 8,307,844 B2 | * | 11/2012 | Hagenbuch | 137/426 |
| 2010/0224263 A1 | | 9/2010 | Riedel et al. | |
| 2013/0284529 A1 | * | 10/2013 | Kral et al. | 180/68.1 |

FOREIGN PATENT DOCUMENTS

| | | |
|---|---|---|
| CN | 202271831 | 6/2012 |
| EP | 0 976 677 | 2/2000 |

\* cited by examiner

*Primary Examiner* — John K Fristoe, Jr.
*Assistant Examiner* — Reinaldo Sanchez-Medina
(74) *Attorney, Agent, or Firm* — Finnegan, Henderson, Farabow, Garrett & Dunner, LLP

(57) ABSTRACT

A fluid tank assembly is provided for use with a mobile machine. The fluid tank assembly may have a tank with a lower surface, an upper surface located opposite the lower surface, and at least one side surface joining the lower and upper surfaces. The tank may also have a first opening disposed within the upper surface at a first elevation, and a second opening disposed within the upper surface at a second elevation. The fluid tank assembly may further have a float valve interchangeably mountable within the first and second openings, and a plug interchangeably mountable within the first and second openings. The fluid tank assembly may also have a fill port mounted within one of the upper surface and the at least one side surface and fluidly connected to the float valve. Movement of the float valve may function to open and close the fill port.

20 Claims, 3 Drawing Sheets

DUAL CAPACITY FLUID TANK ASSEMBLY

TECHNICAL FIELD

The present disclosure relates generally to a fluid tank assembly and, more particularly, to a fluid tank assembly having dual capacities.

BACKGROUND

A mobile machine is required to carry fuel in an amount related to its intended application. For example, in long-haul applications where refueling is not possible or practical, a particular machine should carry a large volume of fuel. In other applications, however, the same machine may consume less fuel and/or be able to refuel more frequently. In these latter applications, carrying the larger amount of fuel increases a weight of the machine and decreases a carrying capacity and/or efficiency of the machine. And an overweight machine may violate travel regulations.

Historically, mobile machines in diverse applications have been equipped with different fuel tanks that have specific volumes designed for the particular applications. This approach of equipping different machines with different fuel tanks, however, can be costly and problematic. In particular, this approach can drive the need to design, fabricate, and stock a range of different tanks. Different tooling may be required to fabricate each tank; and a large of amount of space may be required to store the tanks. In addition, when a particular machine is re-tasked from a short-haul or weight-restricted application to a long-haul or non-restricted application, the machine must be called out of service to have its fuel tank switched. This requirement can be costly and prone to error.

One attempt to address the above-described problems is disclosed in U.S. Pat. No. 7,089,954 (the '954 patent) that issued to Crawford et al. on Aug. 15, 2006. In particular, the '954 patent discloses a fuel tank configuration having a buoyant fill-limit valve disposed within a fuel tank and movable to open and close a vapor outlet. When the vapor outlet is closed, a vapor pressure within the tank increases during filling, causing the fuel to rise in a fill spout of the tank. When the fuel level rises far enough up the fill spout, the fuel wets a sensor, causing a fill nozzle to shut off at a maximum fuel level of the tank. The maximum fuel level of the tank can be varied by rotating a fill limit adjuster, which lets fuel come into contact with the fill-limit valve at different fill levels. The fill limit adjuster is set during manufacture and welded in a fixed position to permanently secure the maximum fuel level of the tank.

Although the fuel tank configuration of the '954 patent may successfully vary a capacity of a fuel tank, it may still be problematic. Specifically, it may only function correctly when used with a fuel nozzle having a sensor. In addition, because the maximum fill limit is permanently set during manufacture of the tank, a machine equipped with the tank may be limited in its application. Further, the way in which the fill limit adjuster is set may be prone to error.

The disclosed fluid tank assembly is directed to overcoming one or more of the problems set forth above.

SUMMARY

In one aspect, the present disclosure is directed to a fluid tank assembly for a mobile machine. The fluid tank assembly may include a tank defining an enclosed volume. The tank may have a lower surface, an upper surface located opposite the lower surface, and at least one side surface joining the lower and upper surfaces. The tank may also have a first opening disposed within the upper surface at a first elevation, and a second opening disposed within the upper surface at a second elevation different from the first elevation. The fluid tank assembly may further include a float valve interchangeably mountable within the first and second openings and extending at least partially into the enclosed volume, and a plug interchangeably mountable within the first and second openings. The fluid tank assembly may also include a fill port mounted within one of the upper surface and the at least one side surface in fluid communication with the enclosed volume and fluidly connected to the float valve. Movement of the float valve may function to open and close the fill port.

In another aspect, the present disclosure is directed to a method of adjusting a capacity of a fluid tank. The method may include removing a float valve from a first elevation on the fluid tank, and installing the float valve at a second elevation on the fluid tank. The method may also include capping off an unused opening at the first elevation previously occupied by the float valve.

DETAILED DESCRIPTION

Figure 1:
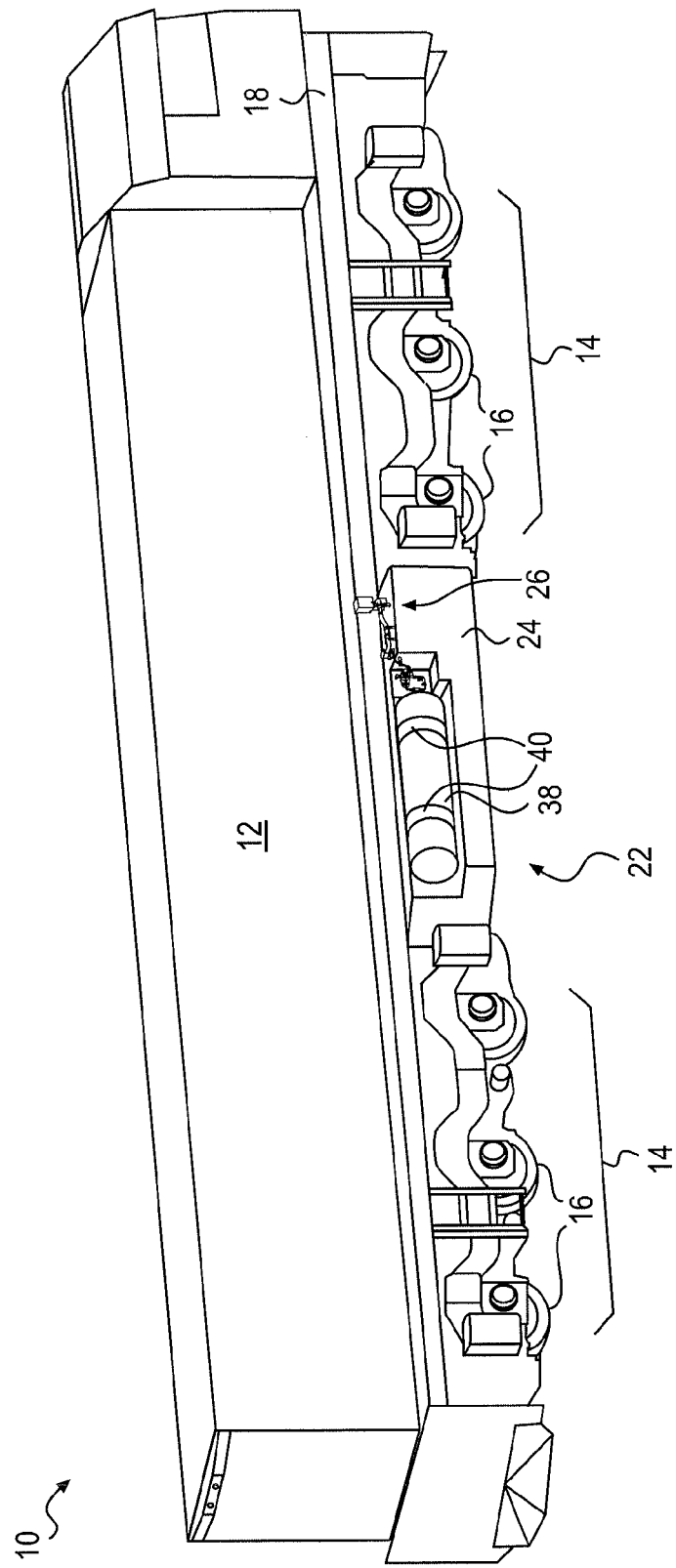
FIG. 1 is an isometric illustration of an exemplary disclosed machine.
Figure 2:
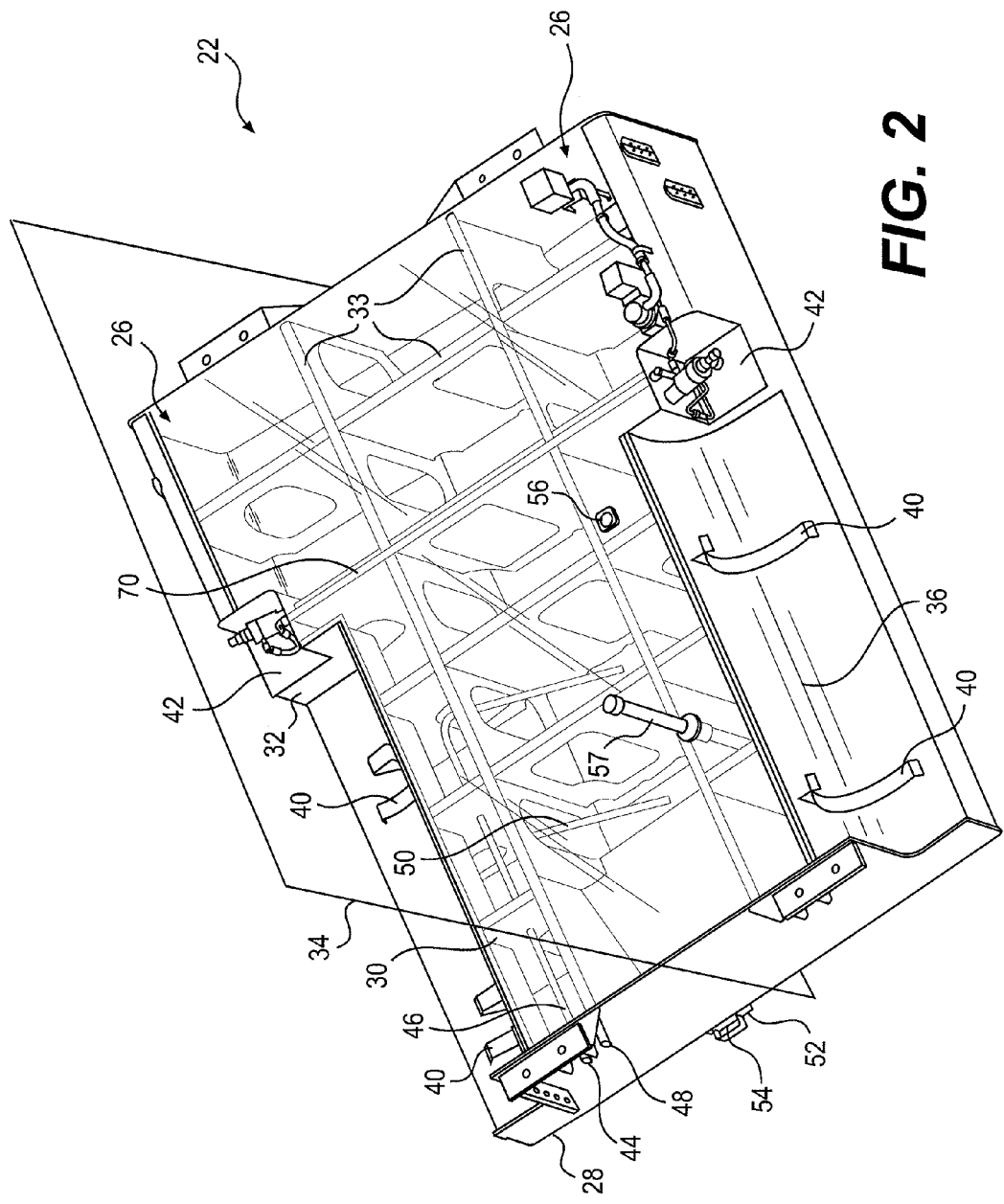
FIG. 2 is an isometric illustration of an exemplary disclosed fluid tank assembly that may be used in conjunction with the machine of FIG. 1.

FIG. 1 illustrates an exemplary machine 10. Machine 10 may be a mobile machine that performs some type of operation associated with an industry such as transportation, farming, mining, construction, or any other industry known in the art. For example, machine 10 may be a locomotive or tender car of a consist. Machine 10 may include, among other things, a car body 12 that is supported at opposing ends by a plurality of trucks 14. Each truck 14 may be configured to engage a track (not shown) via a plurality of wheels 16, and support a frame 18 of car body 12. Any number of engines (not shown) may be mounted to frame 18, housed within car body 12, and configured to produce electricity that drives wheels 16. Each engine may draw fuel, water, oil, coolant, and/or another fluid from a fluid tank assembly 22 to support operation thereof. Fluid tank assembly 22 may be connected to frame 18 at a location below car body 12 and between trucks 14.

Fluid tank assembly 22 may include components that function together to contain one or more different fluids, receive replenishing flows of the fluid(s), regulate amounts of the contained fluid(s), monitor the amounts, and/or dispense the fluid(s). These components may include a tank 24 and one or more fill arrangements 26 connected to tank 24.

Tank 24 may be a container having a lower surface 28 that faces and is generally parallel with the tracks on which machine 10 travels, an upper surface 30 (shown as transparent for clarity only) located opposite lower surface 28, and at least one side surface 32 that joins lower and upper surfaces 28, 30. Lower, upper, and side surfaces 28-32 may at least partially define an enclosed volume. In the disclosed embodiment, the enclosed volume may be about 6,500-7,000 L, although other volumes may also be possible. Any number of baffles 33 may be disposed within the enclosed volume of tank 24, and oriented in lengthwise and/or transverse directions. Baffles 33 may form partial partitions within the enclosed volume that help to reduce fluid movement during irregular travel of machine 10 over uneven terrain.

Tank 24 may take any appropriate shape that accommodates connection to frame 20 and packaging below car body 12 and between trucks 14. In the disclosed embodiment, tank 24 is generally rectangular and symmetric about a lengthwise plane 34 that passes through a transverse center of tank 24 and a transverse center of machine 10. One or more recesses 36 (e.g., curved recesses) may be formed within upper and/or side surfaces 30, 32 to accommodate placement of other machine components (e.g., air tanks 38 associated with a braking system of machine 10), and one or more mounting features (e.g., bands or straps 40) may be fixed to tank 24 at recesses 36 to help connect the components to tank 24. In addition, one more or more steps 42 may be formed in upper surface 30 at an end of recesses 36. As will be described in more detail below, each step 42 may provide a mounting location for a corresponding component of fill arrangement 26.

Tank 24 may be equipped with any number of conventional fluid tank features. These features may include, among other things, a fluid supply port 44 and associated passage 46, a fluid return port 48 and associated passage 50, a primary drain port 52, a secondary drain port 54, a level sensor 56, and an auxiliary fill/drain spout 57. Fluid supply port 44 may allow connection of tank 24 to the engine of machine 10, such that the engine may draw fluid from tank 24 via passage 46. Likewise, fluid return port 48 may allow connection of the engine to tank 24, such that the engine may return un-consumed fluid to tank 24 via passage 50. Primary drain port 52 may allow for manual draining of a primary fluid contained within tank 24 (i.e., of a fluid intended to be contained within tank 24, for example fuel). In contrast, secondary drain port 54 may allow for manual draining of a secondary fluid contained within tank 24 (i.e., of a fluid that has unintentionally entered tank 24, for example water, and collected within a lowermost section of tank 24). Level sensor 56 may be located at a general center of tank 24, embody an electronic sensor (e.g., an ultrasonic sensor), and connected to or otherwise embedded within upper surface 30 of tank 24. Level sensor 56 may be configured to generate a signal indicative of an amount of the primary fluid within tank 24, and to send the signal to a control area and/or operator cabin of machine 10. Auxiliary fill/drain spout 57 may be located at a general center of tank 24, and allow a service technician to add a greater amount of the primary fluid to tank 24, remove some of the primary fluid from tank 24, and/or test the primary fluid contained within tank 24 from a location onboard machine 10. This manual filling, draining, and/or testing may be periodically required depending on the changing location and/or application of machine 10.

Figure 3:
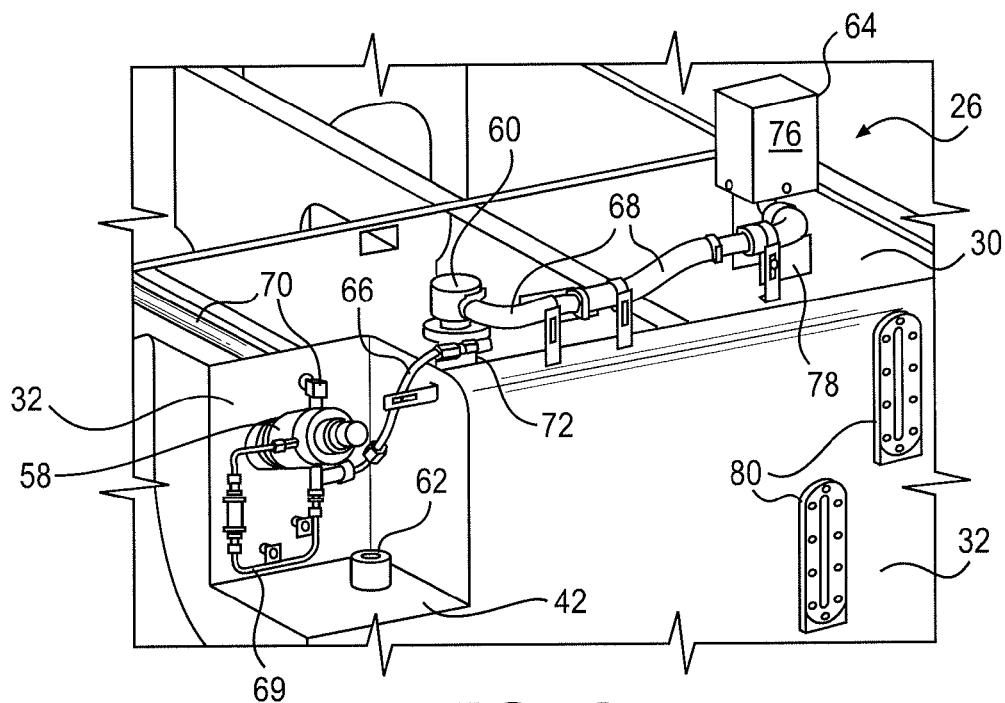
FIGS. 3 and 4 are isometric illustrations of an exemplary disclosed fill arrangement that may be used in conjunction with the fluid tank assembly of FIG. 2.
Figure 4:
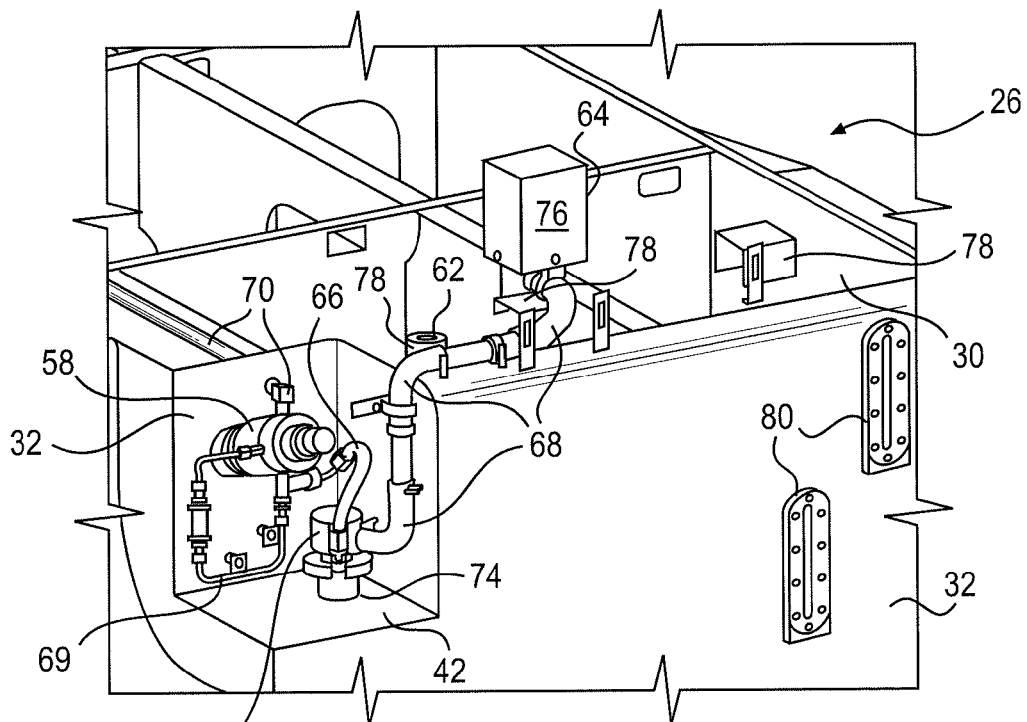

Fill arrangement 26 may be an arrangement of components that are configured to allow the filling of tank 24 with the primary fluid up to a prescribed amount by a pressurized delivery system (not shown) located offboard machine 10. As shown in FIGS. 3 and 4, these components may include a fill port 58, a float valve 60, a plug 62, and a breather 64. Fill port 58 may be disposed within side surface 32 of tank 24 at step 42, in fluid communication with the enclosed volume therein. Float valve 60 may be disposed in upper surface 30 and movable between two different positions, as will be described in more detail below. Plug 62 may fill the position unused by float valve 60. Breather 64 may be mounted at any convenient location on tank 24, for example on upper surface 30. Fill port 58 may be connected to float valve 60 via one or more fluid passages 66, and float valve 60 may be connected to breather 64 via one or more vapor passages 68. In the disclosed embodiment, passages 66 and 68 may remain the same, regardless of the position of float valve 60. An additional pilot passage 69 may connect passage 66 with a valve portion of fill port 58.

Fill port 58 may be any conventional fill port having a quick connect adapter (e.g., a compression adapter) that is configured to engage a fill nozzle (not shown) of the pressurized delivery system in a substantially airtight manner. Fill port 58 may also include a valve element or other mechanism (not shown) that is movable between first and second positions. When the valve element (or other mechanism) is in the first position, a main flow of fluid from the fill nozzle may enter the enclosed volume of tank 24 substantially unimpeded by the valve element. At this same time, a smaller amount of the supplied fluid may flow from fill port 58 through fluid passage 66 and float valve 68 into tank 24, and in parallel through pilot passage 69 to the valve portion of fill port 58. When the valve element of fill port 58 is in the second position, the main flow of fluid into tank 24 may be restricted (and in some instances, completely blocked) by the valve element. The fluid in pilot passage 69 may act as a pilot signal, causing movement of the valve element between the first and second positions based on a pressure of the fluid. As fluid fills tank 24 via fill port 58, fluid vapor from within the enclosed space may be allowed to flow out of tank 24 via an opening (not shown) in float valve 60. From float valve 60, the fluid vapor may continue through vapor passage 68 and breather 64 for discharge to the atmosphere, thereby allowing for a pressure within tank 24 to remain substantially balanced with atmospheric pressure during filling.

Float valve 60 may be configured to affect the pressure of the fluid in pilot passage 69 (and thereby movement of the valve element within fill port 58) depending on an amount of fluid within tank 24. Specifically, float valve 60 may be any conventional float valve having a buoyant element (e.g., a float—not shown), that is configured to remain on top of the fluid within tank 24. As the fluid level rises during filling of tank 24, the buoyant element may also rise. The buoyant element may be connected to a plunger (not shown) and, with this configuration, as the buoyant element rises, the plunger may be pushed by the rising movement to close off the smaller flow of fluid through pilot passage 69 into tank 24. When the buoyant element is at a maximum fill level within tank 24, the connection pilot passage 69 should be completely closed. When this occurs during filling, the pressure of the fluid flowing through fill port 58 into tank 24 may build until the pressure within pilot passage 69 is great enough to move the valve element of fill port 58 to its second position, thereby inhibiting further filling of tank 24. In some embodiments, the valve element of fill port 58 may itself completely block the main flow of fluid into tank 24. In other embodiments, valve element movement may only trigger the fluid delivery nozzle to terminate filling.

Float valve 60 may be manually moved between a high-capacity position (shown in FIG. 3) and a low-capacity position (shown in FIG. 4) at any time throughout the life of machine 10. When float valve 60 is in the high-capacity position, the buoyant element may extend through a first opening 72 in upper surface 30 of tank 24 and allow for a greater amount of fluid to fill tank 24 before the buoyant element moves to close off fluid passage 66. When float valve 60 is in the low-capacity position, the buoyant element may extend through a second opening 74 in step 42 of upper surface 30 that is at a lower elevation than first opening 72. When float valve 60 is in the low-capacity position, float valve 60 may allow for a lesser amount of fluid to fill tank 24. Plug 62 may be used to close off the one of first and second openings 72, 74 that is not currently occupied by float valve 60. In one embodiment, tank 24 may be filled with about 4,000 L of fluid when float valve 60 is in the low-capacity position and about 6,700 L of fluid (i.e., about 65-70% more fluid) when float valve 60 is in the high-capacity position.

Breather 64 may embody any conventional breather having an outer shell 76 that encloses a filtration element (not shown). Outer shell 76 may be mounted to tank 24 via any manner known in the art, for example via a bracket 78. The filtration element may help to separate atomized fluid from air in the vapor, before the air is allowed to discharge to the atmosphere. In some embodiments, one or more check valves (not shown) may be located at a position within fill arrangement 26 (e.g., within float valve 60, breather 64, or vapor passage 68) to allow air to enter tank 24 during operation of machine 10 as the fluid in tank 24 is consumed. In these embodiments, the filtration element may additionally function to remove debris from the air before it is allowed to enter tank 24.

In some embodiments, one more level indicators 80 may be provided at tank 24 for use in determining the level of fluid within tank 24 from a location offboard machine 10. In the disclosed embodiment, two different level indicators 80 are shown, one associated with each possible position of float valve 60. Each of level indicators 80 may be indexed and configured to provide a visual indication of the corresponding fluid levels. For example, level indicators 80 may be in direct fluid communication with the enclosed volume of tank 24 and also transparent, so that the fluid levels may be seen from outside of tank 24 and compared to the indexing.

Fluid tank assembly 22 may be accessed from either side of machine 10. Specifically, tank 24 may be equipped with two substantially fill ports 58, one located at each side. A passage 70 may connect the two fill ports 58, such that both fill ports 58 may utilize a common float valve 60 and breather 64. In this manner, regardless of the location of the offboard pressurized supply system, machine 10 may be appropriately filled with fluid. It is also contemplated that machine 10 may be filled from both sides at the same time, if desired, by way of the two different fill ports 58.

INDUSTRIAL APPLICABILITY

The disclosed fluid tank assembly may be applicable to any mobile machine where different applications call for the fluid tank assembly to be filled to different maximum levels. The disclosed fluid tank assembly may provide for this variability via a unique fill arrangement having a float valve that can be moved to different elevations in the tank assembly. Although primarily intended to contain fuel for use by a locomotive's engine, it should be noted that the disclosed fluid tank may be used to contain any other fluid for any other purpose, as desired.

The disclosed fluid tank assembly may provide several benefits. First, the disclosed fluid tank assembly may be used with any delivery system known in the art, as it may not require the fluid level to raise high enough to reach a fuel nozzle sensor before shutoff can occur. Regardless of the existence of the sensor, the disclosed fluid tank assembly may still be filled with only the desired amount of fluid. In addition, because the maximum fill limit can be changed at any time during machine use, the machine may not be limited in its application. Further, the way in which the disclosed float valve is set may be simple to achieve and easy to visually confirm the correctness of the setting. Accordingly, the likelihood of error in the setting may be low.

It will be apparent to those skilled in the art that various modifications and variations can be made to the fluid tank assembly of the present disclosure. Other embodiments of the fluid tank assembly will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A fluid tank assembly for a mobile machine, comprising:
   a tank defining an enclosed volume, the tank having:
      a lower surface;
      an upper surface located opposite the lower surface;
      at least one side surface joining the lower and upper surfaces;
      a first opening disposed within the upper surface at a first elevation; and
      a second opening disposed within the upper surface at a second elevation different from the first elevation;
   a float valve interchangeably mountable within the first and second openings and extending at least partially into the enclosed volume;
   a plug interchangeably mountable within the first and second openings; and
   a fill port mounted within one of the upper surface and the at least one side surface in fluid communication with the enclosed volume and fluidly connected to the float valve, wherein movement of the float valve functions to open and close the fill port.

2. The fluid tank assembly of claim 1, wherein:
   the tank further has a step in the upper surface;
   the second opening is disposed in the step; and
   the fill port is disposed within the at least one side surface at the step.

3. The fluid tank assembly of claim 1, wherein the fill port is located between the first and second elevations.

4. The fluid tank assembly of claim 1, wherein when the float valve is mounted in the first opening, the tank may be filled to a first volume that is about 65-70% greater than when the float valve is mounted in the second opening.

5. The fluid tank assembly of claim 1, further including a passage connecting the fill port with the float valve when the float valve is mounted in the first and second openings.

6. The fluid tank assembly of claim 1, further including:
   a breather mounted to the tank; and
   a passage connecting the breather with the float valve.

7. The fluid tank assembly of claim 6, further including a passage connecting the tank with the fill port.

8. The fluid tank assembly of claim 1, further including:
   a first level indicator configured to provide a visual indication of a fluid level associated with use of the float valve in the first opening; and
   a second level indicator configured to provide a visual indication of a fluid level associated with use of the float valve in the second opening.

9. The fluid tank assembly of claim 8, wherein the first and second level indicators are mounted at a common location of the tank at different elevations.

10. The fluid tank assembly of claim 1, wherein:
    the tank is substantially symmetrical about a plane passing through a lengthwise center;
    the fill port is a first fill port; and the tank further includes a second fill port mounted at a side opposite the first fill port in fluid communication with the enclosed volume and fluidly connected to the float valve via the first fill port.

11. The fluid tank assembly of claim 10, further including an auxiliary fill/drain spout located between the first and second fill ports.

12. The fluid tank assembly of claim 10, further including an ultrasonic sensor located between the first and second fill ports.

13. The fluid tank assembly of claim 10, further including:
a fluid supply port located at an end of the tank; and
a fluid return port located adjacent the fluid supply port.

14. The fluid tank assembly of claim 13, further including:
a primary fluid drain port located at the end of the tank; and
a secondary fluid drain port located adjacent the primary fluid drain port.

15. The fluid tank assembly of claim 1, wherein:
the tank includes recesses at sides thereof and configured to receive air tanks of the mobile machine; and
the fluid tank assembly further includes bands configured to secure the air tanks in the recesses.

16. The fluid tank assembly of claim 15, wherein the recesses are curved to accommodate curvature of the air tanks.

17. The fluid tank assembly of claim 1, further including baffles mounted within the tank.

18. A method of adjusting a capacity of a fluid tank, the method comprising:
removing a float valve from a first elevation on the fluid tank;
installing the float valve at a second elevation on the fluid tank; and
capping off an unused opening at the first elevation previously occupied by the float valve.

19. The method of claim 18, wherein a fill port of the fluid tank remains fluidly connected to the float valve during the removing and installing.

20. A mobile machine, comprising:
a frame;
a car body connected to the frame;
a plurality of trucks configured to support the frame; and
a tank assembly connected to the frame below the car body and between the plurality of trucks, the tank assembly including:
a tank defining an enclosed volume, the tank having:
a lower surface;
an upper surface located opposite the lower surface;
at least one side surface joining the lower and upper surfaces;
a first opening disposed within the upper surface at a first elevation;
a step formed in the upper surface; and
a second opening disposed within the step at a second elevation different from the first elevation;
a float valve interchangeably mountable within the first and second openings and extending at least partially into the enclosed volume;
a plug interchangeably mountable within the first and second openings;
a fill port mounted within the at least one side surface in fluid communication with the enclosed volume;
a breather mounted to the tank;
a first passage fluidly connecting the tank with the fill port;
a second passage fluidly connecting the fill port with the float valve; and
a third passage connecting the float valve with the breather,
wherein:
movement of the float valve functions to open and close the fill port; and
when the float valve is mounted in the first opening, the tank may be filled to a first volume that is about 65-70% greater than when the float valve is mounted in the second opening.

* * * * *